UNITED STATES PATENT OFFICE.

RALPH H. WATSON, OF MUNHALL, PENNSYLVANIA.

PROCESS OF RECOVERING NICKEL-STEEL SCRAP.

934,864.  Specification of Letters Patent.  Patented Sept. 21, 1909.

No Drawing.  Application filed July 20, 1907. Serial No. 384,755.

*To all whom it may concern:*

Be it known that I, RALPH H. WATSON, of Munhall, Allegheny county, Pennsylvania, have invented a new and useful Process of Recovering Nickel-Steel Scrap, of which the following is a full, clear, and exact description.

My invention relates to recovering or utilizing steel scrap containing nickel with or without other metals or metalloids. This nickel scrap results in large quantities from the manufacture of various products formed from or containing nickel or nickel steels. If such scrap is charged into an open hearth furnace in the ordinary manner with pig iron either molten or cold, the nickel content of the charge is of course proportionately diluted and more nickel must be added in some form in order to produce nickel steel of the proper nickel content. This therefore necessitates the constant purchase of new nickel. My invention overcomes this drawback of the necessity for producing new nickel to mix with such charges, and provides a simple, cheap and easily carried out method, by which nickel scrap may be converted into nickel steel.

In carrying out my method in its preferred form, I charge an open hearth furnace in the ordinary manner with a flux such as lime or other basic material. On the flux I then charge carbon, preferably in the form of coke, charcoal, graphite, coal or any other convenient form. This carbon is preferably spread out over the flux on the bottom. The nickel steel scrap is then charged in the ordinary manner on top of the carbon. The heat is then proceeded with in the ordinary manner, and the carbon added to the charge supplies carbon to the bath in sufficient quantity to supply the necessary carbon content for liquefying and working the charge down into steel. In carrying out the process I have obtained as high as 1.45% content of carbon in the charge after melting and before working down.

The advantages of my invention will be apparent to those skilled in the art. The dilution of the nickel in the scrap which has heretofore been necessary because of the addition of pig iron to the charge, is done away with, and a nickel steel is produced of substantially the same nickel content as the scrap used in the charge. This nickel scrap accumulates in large quantities, owing not only to the scrap lost in cutting articles to their desired shape, but also in the return of worn-out articles formed wholly or in part of nickel steel. A considerable commercial advantage results from my process, since the accumulation of nickel scrap is prevented. The demand for nickel steel is only in certain products, and the scrap returned, either in the operation of making the articles or from the worn out articles returned, leads to an over-supply of nickel steels where the old methods were employed. My method overcomes this difficulty, and enables me to prevent the supply from exceeding the demand.

In carrying out my process, the carbonaceous material for adding carbon to the nickel scrap may be added in the form of a carrier having a large percentage of carbon—larger than that of commercial pig iron. Pig iron may be added to the charge, if desired without departing from my invention. With some varieties of nickel scrap it is advisable to omit the flux on the bottom of the furnace, spreading the carbonaceous material on the bottom as before. In such case whatever flux is used may be added to the bath after the material is melted or while melting.

The above description applies to my process as carried out in a basic open hearth furnace, but the process may be carried out as well in an acid open hearth furnace instead of a basic open hearth furnace, in which case, of course, the flux will be changed correspondingly.

The carbon or highly carbonaceous material may be added to the charge either before melting, during melting, or after melting, and either above or below the charge or mixed with it. It should preferably be added before the slag accumulates.

Other variations may be made in the process without departing from my invention.

I claim:—

1. The method of making nickel steel, consisting in melting nickel steel scrap in an open hearth furnace in the presence of carbonaceous material to liquefy the scrap and then reducing the carbon content and working the bath down into nickel steel; substantially as described.

2. The method of making nickel steel, consisting in melting nickel steel scrap in an open hearth furnace in the presence of sufficient carbonaceous material to liquefy the bath, and then working down the charge and thereby producing nickel steel of substantially the same nickel content as the scrap which is employed; substantially as described.

In testimony whereof, I have hereunto set my hand.

RALPH H. WATSON.

Witnesses:
　JOHN MILLER,
　H. M. CORWIN.